(12) United States Patent
Deveaux et al.

(10) Patent No.: US 7,734,359 B2
(45) Date of Patent: Jun. 8, 2010

(54) SYSTEMS AND METHODS FOR CAPTURING DATA WITHIN AN INTELLIGENT ELECTRONIC DEVICE (75) Inventors: Robert C. Deveaux, Oshawa (CA);
Claudio Cargnelli, Toronto (CA);
Raymond G. Johnson, Oakville (CA)

(73) Assignee: General Electric Company, Schenectady, NY (US)

( * ) Notice: Subject to any disclaimer, the term of this patent is extended or adjusted under 35 U.S.C. 154(b) by 797 days.

(21) Appl. No.: 11/273,000

(22) Filed: Nov. 14, 2005

(65) Prior Publication Data

US 2007/0112446 A1    May 17, 2007

(51) Int. Cl.
*G05B 15/00* (2006.01)

(52) U.S. Cl. .............................. 700/83; 700/286; 713/1

(58) Field of Classification Search ................... 700/83, 700/286; 702/62; 717/168; 713/1
See application file for complete search history.

(56) References Cited

U.S. PATENT DOCUMENTS

| 5,925,998 | A | 7/1999 | Olson | |
| 6,005,759 | A * | 12/1999 | Hart et al. | 361/66 |
| 6,301,527 | B1 | 10/2001 | Butland et al. | |
| 6,477,589 | B1 * | 11/2002 | Suzuki et al. | 710/18 |
| 6,792,337 | B2 | 9/2004 | Blackett et al. | |
| 6,853,978 | B2 | 2/2005 | Forth et al. | |
| 6,871,150 | B2 | 3/2005 | Huber et al. | |
| 2002/0010801 | A1 | 1/2002 | Meagher et al. | |
| 2002/0165677 | A1 * | 11/2002 | Lightbody et al. | 702/62 |
| 2003/0154471 | A1 | 8/2003 | Teachman et al. | |
| 2004/0093468 | A1 * | 5/2004 | Carr et al. | 711/141 |
| 2006/0155422 | A1 * | 7/2006 | Uy et al. | 700/286 |

* cited by examiner

*Primary Examiner*—Albert DeCady
*Assistant Examiner*—Steven R Garland
(74) *Attorney, Agent, or Firm*—GE Global Patent Operation; Roger C. Phillips (57) ABSTRACT A method for capturing data includes recording, within an intelligent electronic device (IED), information regarding an initial change to one of a firmware within the IED, a hardware within the IED, and a configuration within the IED.

25 Claims, 8 Drawing Sheets

SYSTEMS AND METHODS FOR CAPTURING DATA WITHIN AN INTELLIGENT ELECTRONIC DEVICE

BACKGROUND OF THE INVENTION

This invention relates generally to intelligent electronic devices (IEDs) and more particularly to systems and methods for capturing data within IEDs.

An intelligent electronic device (IED), such as a programmable logic controller (PLC), a remote terminal unit (RTU), an electric meter, a protection relay, and a fault recorder, makes use of a memory and a microprocessor to provide increased versatility and additional functionality. The functionality includes an ability to communicate with remote computing systems, either via a direct connection, such as a modem, or via a network. The IED often includes firmware or operating software, which is built or programmed into the IED and which directs the microprocessor and other hardware to perform a plurality of desired functions of the IED. Often, the IED is installed in a place that is difficult to access, so it is desirable to be able to upgrade the IED remotely from a computer by transferring a new firmware code via a communications link, such as an Ethernet, RS-485, RS-232, modem, and/or other form of wired or wireless link.

Currently, few methods track changes made to the IED and those methods typically are inaccurate. For example, a laptop makes a first change to the IED and tracks the first change. The computer makes a second change to the IED and tracks the second change. However, the computer is unaware of the first change and the laptop is unaware of the second change.

BRIEF DESCRIPTION OF THE INVENTION

In one aspect, a method for capturing data includes recording, within an intelligent electronic device (IED), information regarding an initial change to one of a firmware within the IED, a hardware within the IED, and a configuration within the IED.

In another aspect, an intelligent electronic device (IED) includes a memory and a processor. The processor is configured to record, within the IED, information regarding an initial change made to one of a firmware within the IED, a hardware within the IED, and a configuration within the IED.

In yet another aspect, a power management control system (PMCS) includes a computing unit, an interface coupled to the computing unit, and an intelligent electronic device (IED) coupled to the computing unit via the interface. The IED is separate from the computing unit. The IED includes a processor configured to record, within the IED, information regarding an initial change made to one of a firmware within the IED, a hardware within the IED, and a configuration within the IED.

DETAILED DESCRIPTION OF THE INVENTION

Figure 1:
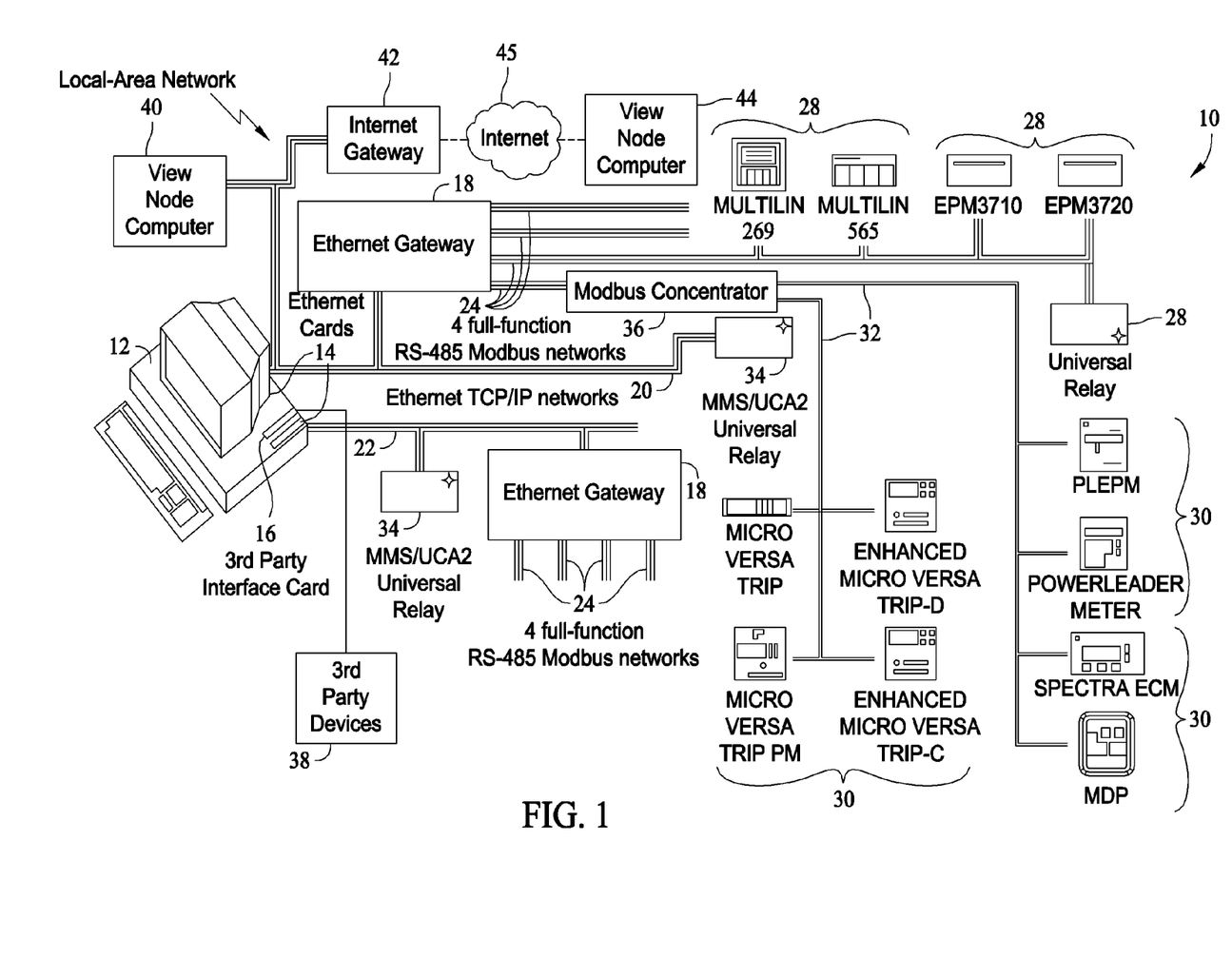
FIG. 1 is a block diagram of an embodiment of a power management control system.

FIG. 1 is a block diagram of an embodiment of a power management control system (PMCS) 10. PMCS 10 includes a computing unit 12, a plurality of Ethernet interface cards 14, a third-party interface card 16, a plurality of Ethernet gateways 18, a plurality of Ethernet Transmission Control Protocol/Internet Protocol (TCP/IP) networks 20 and 22, a plurality of Modbus Remote Terminal Unit (RTU) networks 24, a first group 28 of intelligent electronic devices (IEDs), a second group 30 of IEDs, a plurality of Commnet networks 32, a third group 34 of IEDs, a Modbus concentrator 36, a fourth group 38 of third-party IEDs, a view node computer 40, an Internet gateway 42, a view node computer 44, and the Internet 45. Modbus is a registered trademark of Gould Corporation located at 10 Gould Center, Rolling Meadows, Ill. 60008. PMCS 10 allows monitoring and control of the IEDs of an electrical distribution system.

Computing unit 12 includes a computer having Ethernet interface cards 14 and third-party interface card 16 installed in I/O slots of computing unit 12. Other examples of computing unit 12 include a personal digital assistant (PDA), a portable computer, and any other microprocessor based computing device capable of storing data and communicating with the IEDs within one of first group 28, second group 30, third group 34, and fourth group 38. Computing unit 12 includes software for monitoring and controlling power consumption. Ethernet gateways 18 are connected to Ethernet TCP/IP networks 20 and 22 to provide an interface between an Ethernet TCP/IP protocol and a Modbus RTU protocol. Ethernet gateway 18 provides a connection between Ethernet TCP/IP networks 20 and 22 and Modbus RTU networks 24. The Ethernet TCP/IP protocol is an Institute of Electrical and Electronic Engineers (IEEE) standard 802.3, which allows a user of PMCS 10 to use an existing local area network (LAN).

First group 28 of IEDs is connected to Modbus RTU networks 24, second group 30 of IEDs is connected to Commnet networks 32, and third group 34 of IEDs is connected to Ethernet networks 20 and 22. Each IED in first group 28 has a Modbus RTU interface, which is connected to Modbus RTU networks 24. Examples of IEDs in first group 28 include control devices, such as Multilin models 269 and 565, power management EPM 3710 and EPM 3720, and a Universal Relay family of modular relay devices available from General Electric Company, 1 River Road, Schenectady, N.Y. 12345. Second group 30 of IEDs communicates using a Commnet protocol, and includes trip units, such as, a Micro Versa Trip, an Enhanced MicroVersa Trip-D and an Enhanced MicroVersa Trip-C Units, which are commercially available from General Electric Company, meters, such as, Power Leader Meters commercially available from General Electric Company, and relays, such as, Spectra ECM and Power Leader MDP available from General Electric Company. Modbus concentrator 36 provides an interface between the Modbus RTU protocol and the Commnet protocol, to enable second group 30 of IEDs to communicate through Modbus concentrator 36 with Modbus RTU networks 24. Third group 34 of IEDs have an Ethernet interface and are connected to Ethernet TCP/IP networks 20 and 22. Third group 34 of IEDs includes, for example, the Universal Relay family of modular relay devices. Third group 34 of IEDs is arranged to communicate using a Manufacturing Message Specification (MMS) protocol. Fourth group 38 of third-party IEDs include IEDs manufactured by a third-party that use a proprietary protocol. Fourth group 38 of third-party IEDs is connected to computing unit 12. Optionally, fourth group 38 of third-party IEDs is connected to the Ethernet TCP/IP networks 20 and 22 via a gateway designed for the Ethernet TCP/IP protocol, to the Modbus RTU networks 24 via a gateway designed for the Modbus RTU protocol, or alternatively to Commnet networks 32 via a concentrator designed for the Commnet protocol.

Ethernet TCP/IP network 20 is coupled to view node computer 40 and Internet gateway 42. View node computer 40 interacts with computing unit 12 through an Object Linking and Embedding (OLE) for Process Control/Distributed Component Object Model (OPC/DCOM) link or alternatively a Net Dynamic Data Exchange (NetDDE) link established via Ethernet TCP/IP network 20. Similarly, view node computer 44 interacts with computing unit 12 through an OPC/DCOM link or alternatively a NetDDE link established via Internet 45, Internet gateway 42, and Ethernet TCP/IP network 20.

Figure 2:
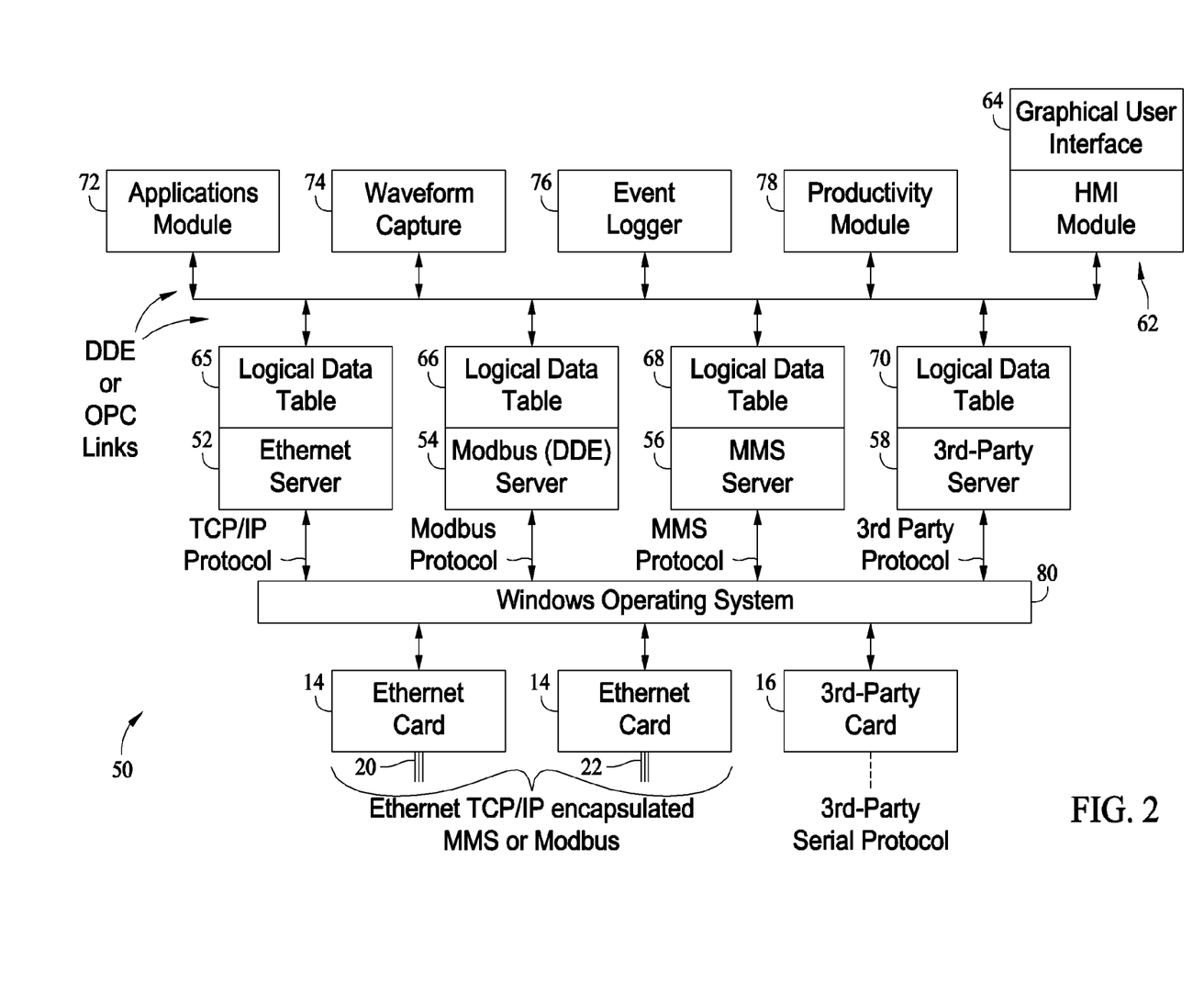
FIG. 2 is a block diagram of an embodiment of a software implemented within the power management control system of FIG. 1.

FIG. 2 is a block diagram of an embodiment of a software 50 for monitoring and controlling power consumption. Software 50 includes an Ethernet server 52, a Modbus server 54, an MMS server 56, and a third-party proprietary protocol server 58, a Human-Machine Interface (HMI) module 62 having a graphical user interface (GUI) 64, a logical data table 65, a logical data table 66, a logical data table 68, a logical data table 70, an applications module 72, such as Microsoft Excel, a waveform capture module 74, an event logger module 76, and productivity module 78, and Windows operating system 80. Software 50 is loaded into computing unit 12 by the user. Each of servers 52, 54, 56, and 58 allows HMI module 62, applications module 72, waveform capture module 74, event logger module 76, and productivity module 78 running on computing unit 12 to access power management data from the IEDs within first group 28, second group 30, third group 34, and fourth group 38. An interface between the user and servers 52, 54, 56, and 58 is provided through HMI module 62. Ethernet server 52 is also commercially available, for example, as DDE server-Ethernet Version available from General Electric Company. Ethernet server 52 provides for network layer TCP/IP encapsulation for communications over Ethernet TCP/IP networks 20 and 22. Modbus server 54 includes an application operating under Windows operating system 80. Modbus server 54 allows applications module 72, waveform capture module 74, event logger module 76, and productivity module 78 to access power management data from the IEDs that are located within first group 28 and that communicate using the Modbus RTU protocol. MMS server 56 is commercially available, for example, as AX-S4MMS MMS server available from Systems Integration Specialists Company 6605 19.5 mile road, Sterling Heights, Mich. 48314-1408. MMS server 56 allows applications module 72, waveform capture module 74, event logger module 76, and productivity module 78 to access power management data from third group 34 of IEDs, which communicate using the MMS protocol. Third-party server 58 allows communications between applications module 72, waveform capture module 74, event logger module 76, and productivity module 78 and fourth group 38 of third-party IEDs, which use the proprietary protocol.

Associated with servers 52, 54, 56, and 58 are logical data tables 65, 66, 68, and 70, applications module 72, waveform capture module 74, event logger module 76, productivity module 78, and HMI module 62. HMI Module 62 includes a tool kit for building screens and interfaces, and GUI 64 for monitoring and control of PMCS 10. GUI 64 operates in a Windows environment using HMI library functions. Waveform capture module 74 provides for viewing and analysis of waveform, such as, Fourier, frequency and/or harmonic waveforms, captured by a meter, such as a Powerleader meter within second group 30. Event logger module 76 provides for viewing, organizing and analyzing unusual behavior in PMCS 10. Productivity module 78 includes a cost allocation module and a load management module. The cost allocation module provides for tracking power consumption to a sub-unit level and developing internal billing methods and reports to reduce cost. The load management module provides for tracing power demand and automatically shedding non-critical loads to prevent peak demand penalties, and provides for timer-based control to reduce power consumption.

Computing unit 12 receives Ethernet TCP/IP packets via Ethernet TCP/IP networks 20 and 22 and Ethernet cards 14. Ethernet server 52 strips the packets of a network layer TCP/IP protocol data to generate stripped data and provides the stripped data to Windows operating system 80. Windows operating system 80 routes the stripped data to one of servers 54, 56, and 58, based on an application layer protocol. One of servers 54, 56, and 58 receives the stripped data, removes application layer protocol data from the stripped data to generate module data, and establishes an OPC or alternatively a DDE link to deliver the module data to the one of modules 72, 74, 76, and 78 to which the module data is addressed. Delivery of a message to an IED within one of first group 28, second group 30, third group 34, and fourth group 38 involves the same procedure, executed in reverse, after computing unit 12 receives the packets, with servers 52, 54, 56, and 58 adding the application layer protocol data and the network layer TCP/IP protocol data to properly format and address the message to the IED.

Serial data, without TCP/IP packaging, is sent to third-party card 16 using the proprietary protocol. Windows operating system 80 routes the serial data directly to third-party server 58, which removes the application layer protocol data from the serial data to generate modified data and creates an OPC or alternatively a DDE link to deliver the modified data to one of modules 72, 74, 76, and 78 that initiated a request for the serial data. Delivery of a communication to third-party server 58 involves the same process, executed in reverse, after third-party card 16 receives the serial data, with third-party server 58 providing the application layer protocol data to properly format the communication sent to an ED within fourth group 38.

Figure 3:
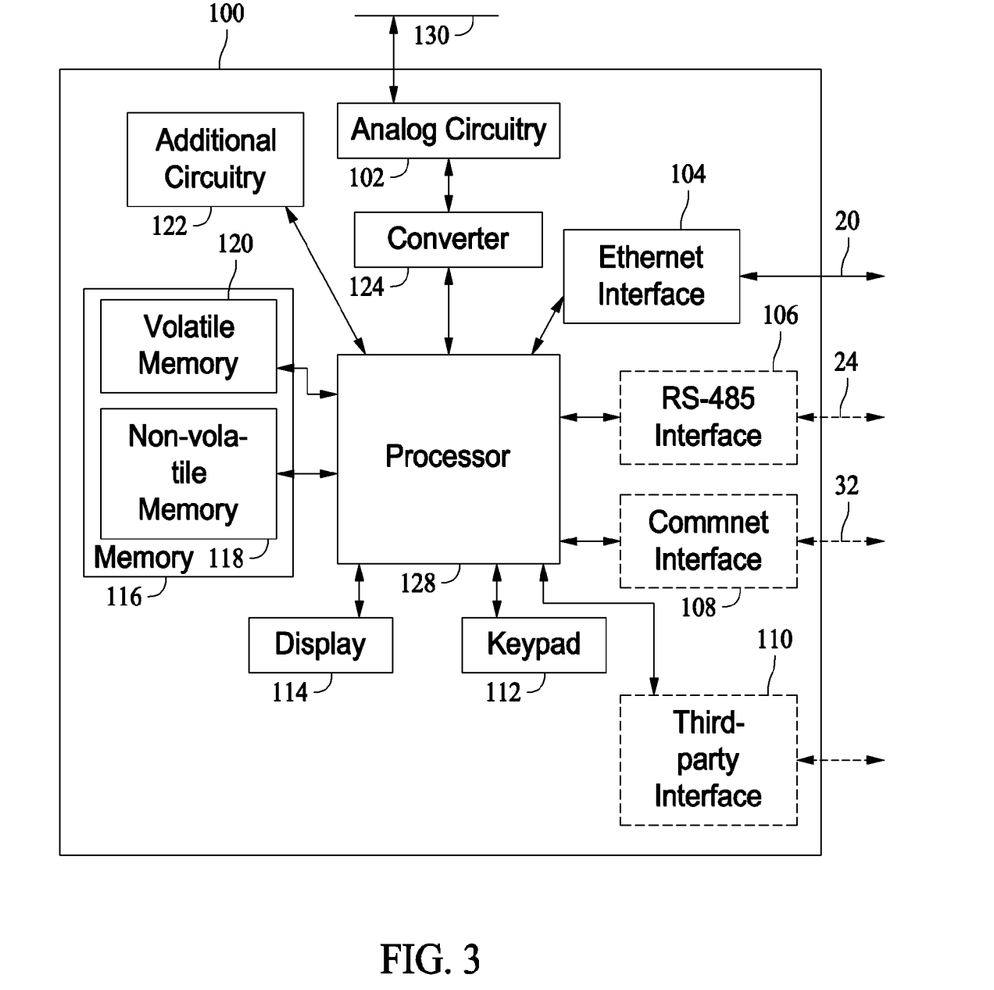
FIG. 3 is a block diagram of an embodiment of an IED included within the power management control system of FIG. 1.

FIG. 3 is a block diagram of an embodiment of an IED 100, which is an example of an IED within one of first group 28, second group 30, third group 34, and fourth group 38. IED 100 includes an analog circuitry 102. IED 100 includes one of an Ethernet interface 104 having a communication port, a RS-485 interface 106 having a communication port, a Commnet interface 108 having a communication port, and a third-party interface 110 having a communication port. In an alternatively embodiment, IED 100 includes all of interfaces 104, 106, 108, and 110 with each of interfaces 104, 106, 108, and 110 having a communication port. Moreover, in another alternative embodiment, RS-485 interface 106 is replaced with an RS-232 interface.

IED 100 further includes a keypad 112, a display 114, a memory 116 having a non-volatile memory 118 and a volatile memory 120, an additional circuitry 122, a converter 124, and a processor 128. IED 100 may also include a front panel serial communications port, such as an RS-232 port and a universal serial bus (USB) port. As an example, IED 100 automatically, without the user's intervention, receives a plurality of input signals from a plurality of input devices, such as electric motors, and automatically, without the user's intervention, controls an electric circuit 130, such as an electric motor. An example of processor 128 includes a type MPC821 processor manufactured by Motorola Corporation located at 1303 East Algonquin road, Schaumburg, Ill. 60196. A processor, such as processor 128, as used herein is not limited to just those integrated circuits referred to in the art as a processor, but broadly refers to a microprocessor, a microcontroller, a microcomputer, a programmable logic controller (PLC), an application specific integrated circuit, and any other programmable circuit. An example of display 114 includes a liquid crystal display (LCD). Non-volatile memory 118 includes a plurality of registers. In an alternative embodiment, a single register having equivalent capacity as the plurality of registers within non-volatile memory 118 may be used. Similarly, volatile memory 120 includes a plurality of registers. In an alternative embodiment, a single register having equivalent capacity as the plurality of registers within volatile memory 120 may be used. An example of volatile memory 120 includes a dynamic RAM (DRAM). Examples of non-volatile memory 118 includes a static RAM (SRAM), an Electrically Erasable Programmable Read Only Memory (EEPROM), ferroelectric RAM (FRAM), and magnetic RAM (MRAM). Examples of Ethernet interface 104 include a 10BaseFL, a 100BaseT, a gigabit Ethernet.

IED 100 may further include a plurality of advanced features, such as, measurements, scheduled or alternatively event driven logging of a sequence of events, relay outputs for control/pulse functions, and optional analog inputs and outputs. Examples of the measurements include an instantaneous 3-phase voltage, a power factor, a time-of-use, and an energy loss compensation measurement. The measurements also include an individual and a total harmonic distortion.

IED 100 is capable of receiving upgrades of a firmware via one of interfaces 104, 106, 108, and 110. Processor 128 executes the firmware to facilitate an operation of IED 100. Examples of a plurality of functions of the firmware include a calculation code for calculating power parameters, such as, volts, amperes, kilowatts (kW), kilo volt-ampere reactive (kVAR), kilo volt-ampere (kVA), kilowatt hours (kWh), kilo volt-ampere reactive hours (kVARh), kilo volt-ampere hours (kVAh), frequency, power factor, and harmonics. Other examples of the functions of the firmware include a communications code for facilitating communication with external devices, such as computing unit 112 and a user interface code for allowing the user to interact with IED 100. The capability of receiving the upgrades includes a plurality of capabilities in the firmware to establish a communications link with one of computing unit 12, view node 40, and view node 44, and receive, install and execute the upgrades. Non-volatile memory 118 is used for non-volatile storage of the firmware and data sent to IED 100. Volatile memory 120 is used to store an executing code for IED 100, volatile data for operation by processor 128, and to temporarily store data that is destined for non-volatile memory 118.

IED 100 is coupled to electric circuit 130 via analog circuitry 110 for monitoring one or alternatively more parameters of electric circuit 130. Processor 128 generates a command to send to electric circuit 102. Converter 124 converts the command from an analog format to a digital format. Analog circuitry 102 receives the command in the digital format, converts the command into a protocol understandable by electric circuit 130, and sends the command to electric circuit 130. Similarly, in a reverse operation, analog circuitry 102 receives a parameter from electric circuit 130 and converts the parameter into a protocol understandable by processor 128. Converter 124 converts the parameter received from analog circuitry 102 from an analog format into a digital format and sends the parameter to processor 128. Processor 128 analyzes the parameter received from converter 124 and generates the command based on the analysis.

FIGS. 4, 5, 6, and 7 are a flowchart of an embodiment of a method for capturing data. Processor 128 determines 202 whether an initial change is to be made within one the firmware, a hardware, and a configuration within IED 100. Examples of the initial change in the hardware within IED 100 include adding or alternatively removing a register from non-volatile memory 118, replacing processor 128 made by Motorola Corporation with a processor made by Intel Corporation, 5000 West Chandler Boulevard, Chandler, Ariz. 85226, and replacing Ethernet interface 104 with RS-485 interface 106. Examples of the initial change in the configuration include configuring display 114 to automatically scroll through a plurality of parameters, such as KVAR and KWh, configuring display 114 to manually scroll through the parameters, configuring display 114 to display the parameters in terms of volts instead of amperes, resetting a plurality of counters within IED 100, and configuring display 114 to display the parameters for an amount of time that is higher than a previous amount of time for which the parameters are displayed on display 114. The configuration is changed by one of keypad 112, computing unit 12, view node 40, and view node 44. Examples of the initial change in the firmware include adding or alternatively deleting lines of code within the firmware and updating a version of the firmware. The firmware is changed by one of computing unit 12, view node 40, and view node 44.

Figure 4:
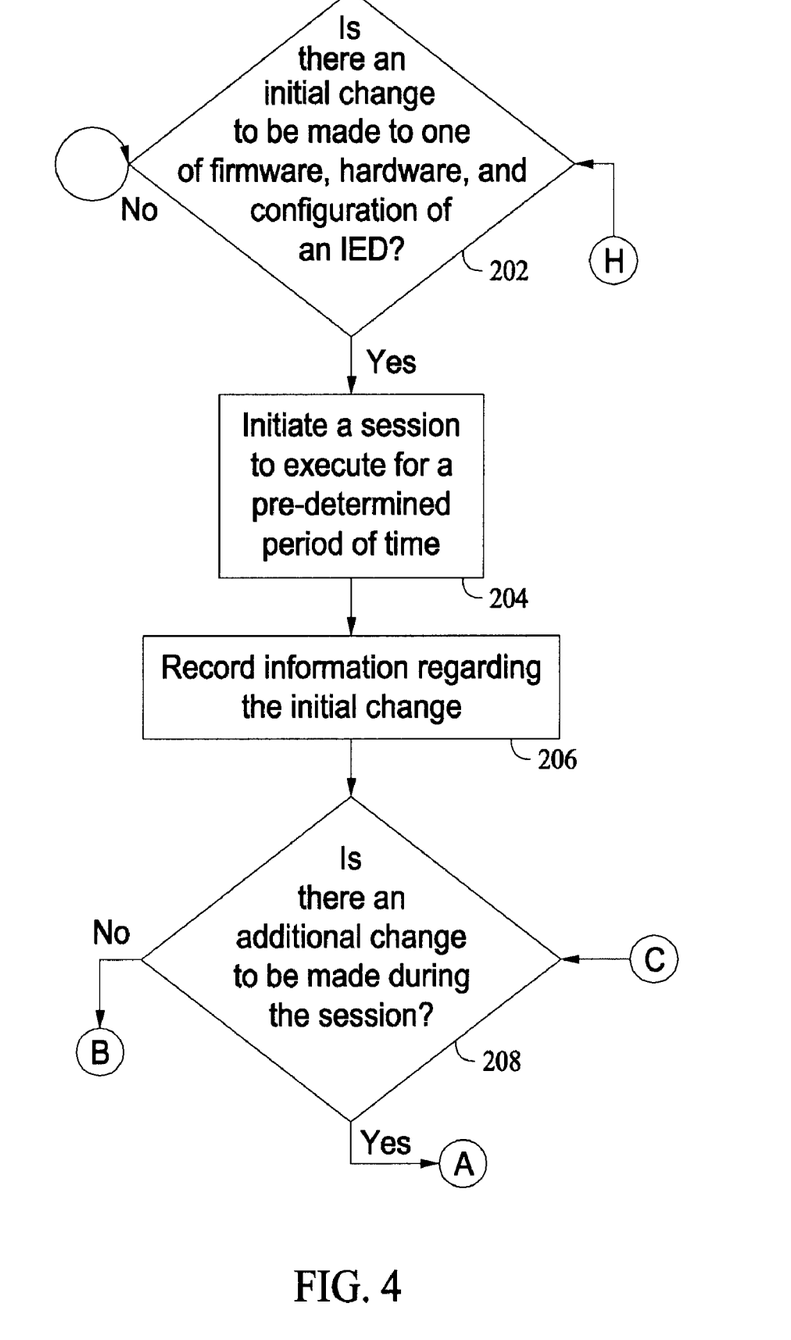
FIG. 4 is a flowchart of an embodiment of a method for capturing data.

As an example, processor 128 determines that the initial change is to be made to the hardware upon determining that the user disconnects the hardware from IED 100. As another example, processor 128 determines that the initial change is to be made to the hardware upon receiving an update order code command from the user and upon determining that the configuration of a replacement of the hardware that is disconnected is different than the configuration of the hardware. As yet another example, processor 128 determines that the initial change is to be made to the firmware upon determining that a request to make the initial change to the firmware is received by processor 128 from one of keypad 112, computing unit 12, view node 40, and view node 44. As still another example, processor 128 determines that the initial change is to be made to the firmware upon determining that an upload mode command is received from the user via one of keypad 112, computing unit 12, view node 40, and view node 44. As another example, processor 128 that the initial change is to be made to the configuration upon determining that a request for the initial change to the configuration is received via one of keypad 112, computing unit 12, view node 40, and view node 44.

Processor 128 continues to check whether the initial change is to be made upon determining that the initial change is not to be made. Upon determining that the initial change is to be made, processor 128 initiates 204 a session that executes for a pre-determined period of time, such as N minutes, where N is a finite real number greater than zero. An example of N includes 10. Processor 128 does not initiate the session upon receiving a passcode, a write command to write to memory 116, and a command, such as activating a light, opening a switch, and closing a switch, that is not a request to make the initial change.

Processor 128 records 206 information regarding the initial change and records the information during the session. Processor 128 records 206 the information regarding the initial change by storing, within non-volatile memory 118, session start data including at least one of a date on which the session starts, a time at which the session starts, a number of a version of the firmware within IED 100 immediately before, such as M seconds before, the start of the session, and a status of operation of processor 128 immediately before the start of the session, where M is a finite real number greater than zero. An example of M includes 1. A default value of each of the date on which the session starts, the time at which the session starts, a number of a version of the firmware immediately before the start of the session, and the status of operation of processor 128 immediately before the start of the session includes zero. Examples of the status of operation of processor 128 include an in-service status represented by a '1', an out-of-service status represented by a '2', and an unknown status represented by a '0'. The status of operation is in-service when processor 128 is operating and the status of operation is out-of-service when processor 128 is not operating. An example of a range of a number of a version of the firmware immediately before the start of the session includes 0.00 to 655.35 with an increment of 0.01 for each version of the firmware. An example of a format of the date on which the session starts includes YYYY/MM/DD, where YYYY represents a year, MM represents a month, and DD represents a day. An example of a format of the time at which the session starts includes HH.MM.SS.sssssss, where HH represents an hour, MM represents a minute, SS represents seconds, and sssssss represents a subset of a second. Processor 128 receives the date on which the session starts and the time at which the session starts from a global positioning system (GPS) clock or alternatively via Internet 45. Processor 128 receives, from the firmware, a number of a version of the firmware immediately before the start of the session.

Processor 128 further records 206 the information by storing, within non-volatile memory 118, connection data including at least one of an event type to which the initial change is to be made, a method of making the initial change, an IP address of one of computing unit 12, view node 40, and view node 44 requesting the initial change, a status of an entry of a password used to make the initial change, and a total number of changes made to one the firmware, hardware, and configuration, made during the session. Examples of the event type include an unknown event type represented by a '0', the initial change, represented by a '1', to the configuration, the initial change, represented by a '2', to the firmware, and the initial change, represented by a '3', to the hardware. Example of the method of making the initial change includes making, represented by a '1', the initial change via keypad 112, making, represented by a '2', the initial change via a port, such as the front panel serial communications port, on front of IED 100, making, represented by a '3', the initial change via RS-485 interface 106, making, represented by a '4', the initial change via Commnet interface 108, making, represented by a '5', the initial change via third-party interface 110, and making, represented by a '6', the initial change via Ethernet interface 104. Examples of the status of entry of the password entered to make the initial change include an entry, represented by a '1', of the password to make the initial change and no entry, represented by a '0', of the password to make the initial change. An example of a range of the total number of changes during the session include 0 to 65535 with an increment of 1 for each change. The default value of each of the event type, the method of making the initial change, the IP address, the status of entry of the password, and the total number of changes made during the session includes a zero.

Processor 128 determines the method of making the initial change based on one of an identification number of keypad 112, an identification number of Ethernet interface 104, an identification number of RS-485 interface 106, an identification number of Comment interface 108, and an identification number of third-party interface 110. For example, if a request for making the initial change includes the identification number of Commnet interface 108, processor 128 determines that the initial change is to be made via Commnet interface 108. As another example, if a request to make the initial change includes the identification number of keypad 112, processor 128 determines that the initial change is to be made via keypad 112. Processor 128 receives the IP address of one of computing unit 12, view node 40, and view node 44 from Internet 45. Processor 128 receives the status of entry of the password to make the initial change from one of computing unit 12, view node 40, and view node 44, and keypad 112 that either receives the password or does not receive the password from the user. Processor 128 includes a counter that counts the total number of changes made within IED 100 during the session.

Processor 128 further records 206 the information by storing, within non-volatile memory 118, externally entered data including at least one of a media access control (MAC) address of one of computing unit 12, view node 40, and view node 44 requesting the initial change, a username entered by the user into one of computing unit 12, view node 40, and view node 44 to make the initial change, and a name and a number of a version of a file uploaded into one of memories 118 and 120 to make the initial change. In an alternate embodiment, the file is uploaded into one of memories 118 and 120 to make the initial change to a plurality of configurations within IED 100. In another alternative embodiment, the file is uploaded into one of memories 118 and 120 to make the initial change to the more than one firmware within IED 100. In yet another alternative embodiment, the file is uploaded into one of memories 118 and 120 to make the initial change to more than one hardware within IED 100. The default value of each of the MAC address, the name of the file uploaded into one of memories 118 and 120 to make the initial change, and the username includes zero.

Processor 128 receives the MAC address from one of computing unit 12, view node 40, and view node 44 requesting the initial change. Processor 128 receives the username from one of computing unit 12, view node 40, and view node 44 requesting the initial change. Processor 128 receives a name and a number of a version of a file uploaded into one of memories 118 and 120 from the file.

Processor 128 also records 206 the information by storing, within non-volatile memory 118, session end data including at least one of a date on which the session ends and a time at which the session ends. An example of a format of the date on which the session ends is the same as the example of the format of the date on which the session starts. An example of a format of the time at which the session ends is the same as the example of the format of the time at which the session starts. Processor 128 obtains the date on which the session ends and the time at which the session ends from the GPS satellite clock or alternatively via Internet 45.

Processor 128 determines 208 whether an additional change is to be made during the session. The additional change is separate from the initial change mentioned above and examples of the additional change are the same as the examples of the initial change. The additional change is made by one of the same IP address and the same MAC address that made the initial change. The additional change is made to one of the same hardware, same firmware, and same configuration to which the initial change is made. Alternatively, the additional change is made to one of an additional hardware, an additional firmware, and an additional configuration to which the initial change is not made.

Figure 5:
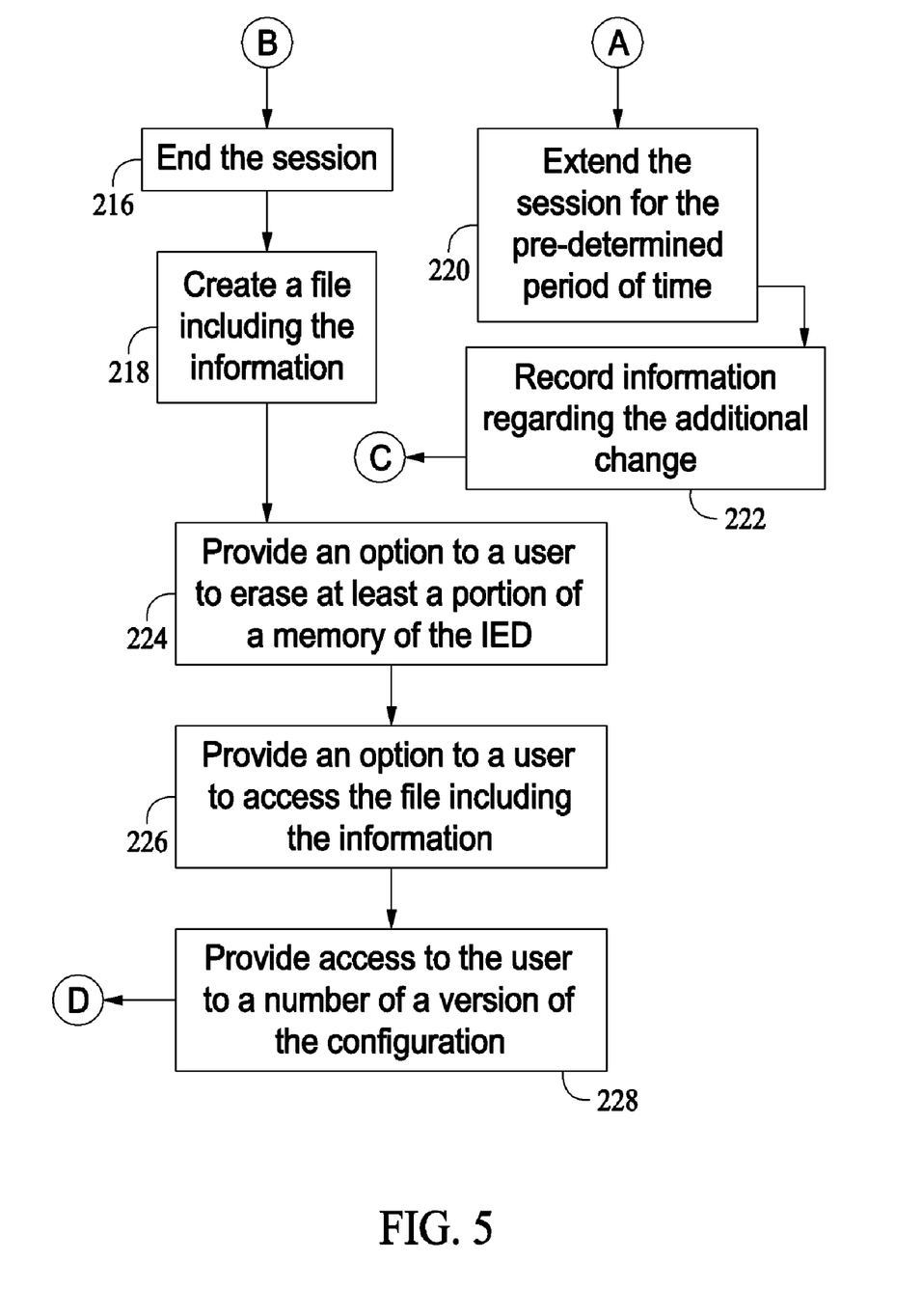
FIG. 5 is a continuation of the flowchart of FIG. 4.

Processor 128 determines 208 whether the additional change is to be made during the session in the same manner in which processor 128 determines 202 whether the initial change is to be made. Upon determining that the additional change is not to be made and upon determining that the pre-determined period of time has elapsed, processor 128 ends 216 the session. As an example, processor 128 ends 216 the session by disconnecting a connection, such as a connection via Internet 45, between IED 100 and one of computing unit 12, view node 40, and view node 44 from which a request for making the initial change is received. As another example, processor 128 ends the session without disconnecting the connection between IED 100 and one of computing unit 12, view node 40, and view node 44 from which a request for making the initial change is received. Processor 128 creates 218 a file, such as a text file, including the information. Processor 128 further resets the session start data, the connection data, the externally entered data, and the session end data to zero, which is the default value.

Upon determining that the additional change is to be made, processor 128 extends 220 the session for the pre-determined period of time and records 222 information regarding the additional change. Processor 128 records 222 the information regarding the additional change in the same manner in which processor 128 records 206 the information regarding the initial change. The information regarding the additional change is the same as the information regarding the initial change. At least one the information regarding the initial change and the information regarding the additional change is referred to as cumulative information.

Processor 128 provides 224 an option to the user to erase the cumulative information after the session ends. Processor 128 does not provide the option to erase the cumulative information during the session. Processor 128 provides 224 the option to erase the cumulative information by generating, on display 114, a GUI that requests an address of a register, within memory 116, in which the cumulative information is stored and a passcode to access the register. In an alternative embodiment, a request for an address of a register, within memory 116, in which the cumulative information is stored and for a passcode to access the register is generated by a processor within one of computing unit 12, view node computer 40, and view node computer 44 on a display within one of computing unit 12, view node computer 40, and view node computer 44. In the alternative embodiment, an address of a register, within memory 116, in which the cumulative information is stored and a passcode to access the register entered by the user are received by the processor within one of computing unit 12, view node computer 40, and view node computer 44 from processor 128. Upon determining that an address of a register, within memory 116, in which the cumulative information is stored and a passcode to access the register are valid, processor 128 provides 224 the option to erase the cumulative information. An example of the option to erase the cumulative information includes a yes option, represented by a '1', to erase a register, within memory 116, in which the cumulative information is stored and a no option, represented by a '0' to avoid erasing the register. Processor 128 determines that an address of a register within memory 116 in which the cumulative information is stored is valid by determining that the address matches with a stored address within another register of memory 116 and determines that the address of the register within memory 116 is invalid by determining that the address does not match the stored address. Processor 128 determines that a passcode to access a register, within memory 116, in which the cumulative information is stored is valid by determining that the passcode matches a stored passcode within another register of memory 116 and determines that the passcode to access the register is invalid by determining that the passcode does not match the stored passcode.

Processor 128 provides 226 an option to the user to access the file created in 218 and including the cumulative information. Processor 128 provides 226 the option to access the file including the cumulative information by creating, on display 114, a GUI that requests a passcode of the file from the user. In an alternative embodiment, a GUI that requests a passcode of the file from the user is generated by a processor within one of computing unit 12, view node computer 40, and view node computer 44 on a display within one of computing unit 12, view node computer 40, and view node computer 44, and the passcode entered by the user is received by processor 128 from the processor within one of computing unit 12, view node computer 40, and view node computer 44. Processor 128 validates a passcode, entered by the user, of the file including the cumulative information in a manner similar to that of validating a passcode to access a register, within memory 116, in which the cumulative information is stored. Processor 128 validates an address of a register, within memory 116, in which the file including the cumulative information is stored in a manner similar to that of validating an address of a register, within memory 116, in which the cumulative information is stored. Upon determining that a passcode to access the file including the cumulative information and an address of a register, within memory 116, in which the file is stored is valid, processor 128 provides 226 the option to the user to access the file. An example of a range of a passcode to access the file including the cumulative information includes 0 to 65535, where 0 is the default value. In an alternative embodiment, when the user provides a specific number, such as 27209, within the range of a passcode entered to access a file including the cumulative information, processor 128 starts a timer for a certain amount of time, such as 10 minutes, during which the user can access the file. After the certain amount of time has elapsed, processor 128 disables access to the file including the cumulative information until the specific number is received.

Figure 6:
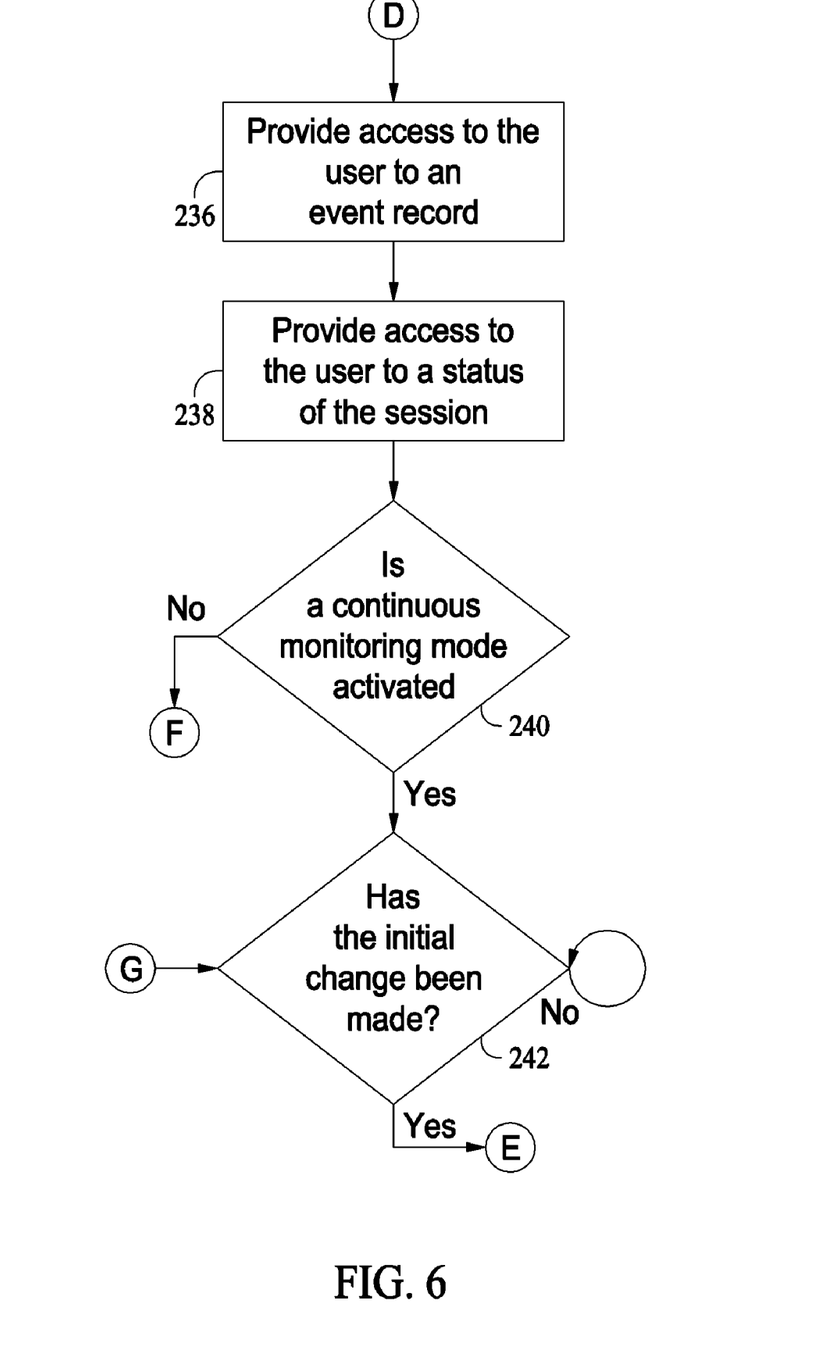
FIG. 6 is a continuation of the flowchart of FIG. 4.

Processor 128 provides 228 access to the user to a number of a version of the configuration. An example of a number of a version of the configuration includes a number of a version of the file uploaded into one of memories 118 and 120. Processor 128 provides 228 access to a number of a version of the configuration by generating, on display 114, a GUI that shows the number. In an alternative embodiment, processor 128 includes a counter that generates an incremented number by incrementing a number of a version of the configuration each time the change is made to the configuration. In the alternative embodiment, processor 128 provides 228 access to a number of a version of the configuration when display 112 displays the incremented number to the user. An example of a range of numbers of versions of the configuration includes 0.00 to 655.35, where 0.00 is the default value. In an alternative embodiment, a GUI that shows a number of a version of the configuration is generated by a processor within one of computing unit 12, view node computer 40, and view node computer 44 on a display within one of computing unit 12, view node computer 40, and view node computer 44, and the number is received by the processor within one of computing unit 12, view node computer 40, and view node computer 44 from processor 128.

Processor 128 provides 236 access to the user to an event record that provides a total number of sessions generated when changes are made to one of the firmware, hardware, and configuration. Processor 128 includes a counter that counts the total number of sessions. Processor 128 provides 236 access to the event record by generating, on display 114, a GUI that displays the event record. In an alternative embodiment, a GUI that displays the event record is generated by a processor within one of computing unit 12, view node computer 40, and view node computer 44 on a display within one of computing unit 12, view node computer 40, and view node computer 44, and the event record is received by the processor within one of computing unit 12, view node computer 40, and view node computer 44 from processor 128.

Processor 128 provides 238 access to the user to a status, such as an active status and an inactive status, of the session. The session is active if the session has begun and inactive if the session has ended. Display 114 displays the status of the session. As an example, display 114 displays a '1' indicating that the session is active and a '0' indicating that the session is inactive, where '0' is the default value.

Optionally or additionally, processor 128 saves, within volatile memory 120, detailed information regarding the initial change of the configuration. Examples of the detailed information include a name of the configuration, an old value of the configuration before the initial change, a new value of the configuration after the initial change, a date of the initial change made to the configuration, a time of the initial change made to the configuration, a number of protection elements within IED 100 that are enabled, a number of monitoring elements within IED 100 that are enabled, and a number of control elements within IED 100 that are enabled. An example of one of the protection elements includes a software, within IED 100, that deenergizes electric circuit 130 that is overheating. An example of one of the monitoring elements, within IED 100, includes a software, within IED 100, that monitors whether electric circuit 130 is operating at an operating speed. An example of one of the controlling elements includes a software, within IED 100, that controls, such as, energizes or deenergizes, electric circuit 130. In an alternative embodiment, processor 128 stores the detailed information corresponding to the initial change in non-volatile memory 118. In the alternative embodiment, processor 128 does not store detailed information regarding the additional change made to the configuration upon determining that the additional change is made within a specific period of time, such as one hour, from a time at which the initial change is made. Examples of the detailed information regarding the additional change is the same as the examples of the detailed information regarding the initial change.

Processor 128 creates a file including the detailed information and provides access to the file upon validating a passcode to access the file and an address of a register, within volatile memory 120, in which the file is stored. Processor 128 validates a passcode to access the file including the detailed information in a similar manner in which processor 128 validates a passcode to access the file including the cumulative information. Processor 128 validates an address of a register, within volatile memory 120, in which the file including the detailed information is stored in a manner similar to that of validating an address of a register, within memory 118, in which the file including the cumulative information is stored.

Figure 7:
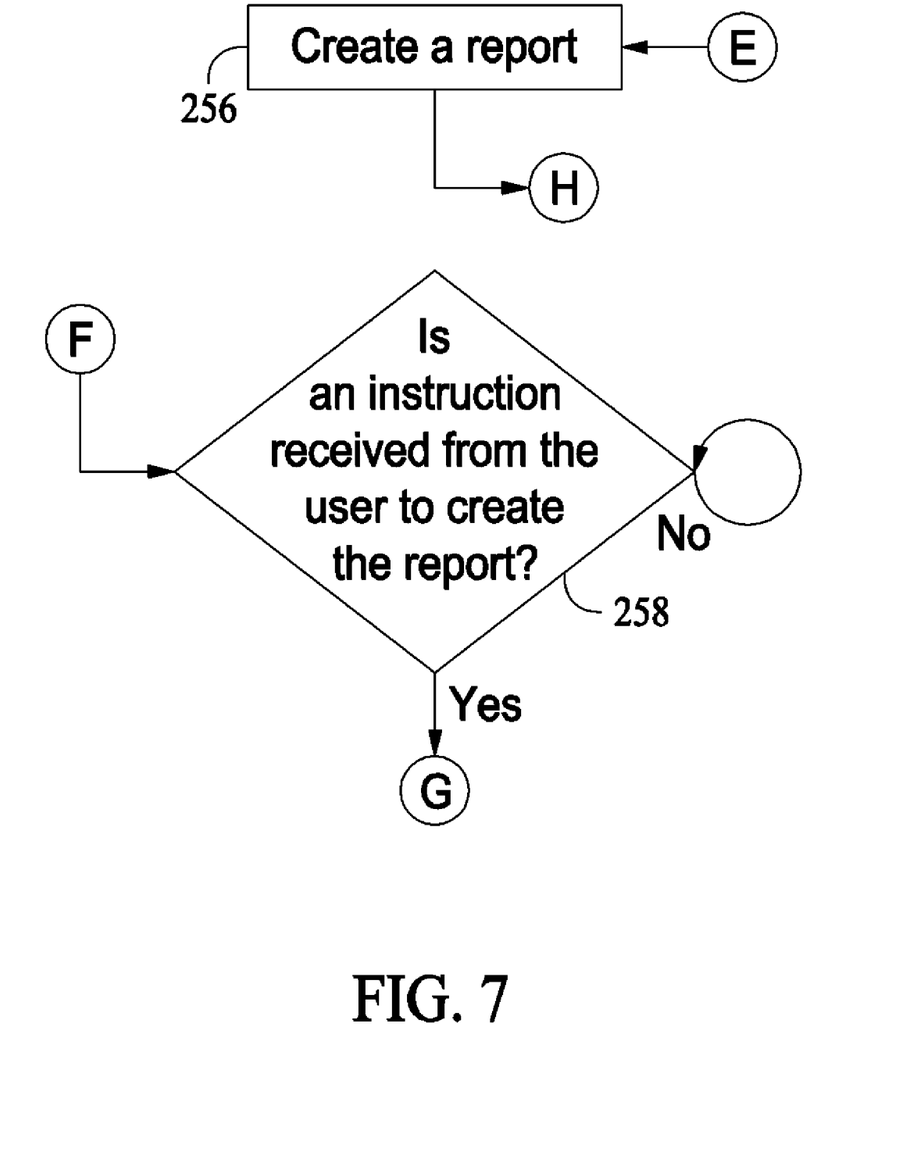
FIG. 7 is a continuation of the flowchart of FIG. 4.

Processor 128 determines 240 whether a continuous monitoring mode is enabled by the user via one of keypad 112, computing unit 12, view node 40, and view node 44. Upon determining that the continuous monitoring mode is enabled, processor 128 queries IED 100 to determine 242 whether the initial change is made to one of the firmware, hardware, and configuration. Processor 128 continues to check whether the initial change is made to one of the firmware, hardware, and configuration upon determining that the initial change is not made. Alternatively, processor 128 checks whether the initial change is made to one of the firmware, hardware, and configuration for a predefined interval, such as once or twice a day. Upon determining that the initial change is made to whether the initial change is made to one of the firmware, hardware, and configuration, processor 128 creates 256 a report including the information regarding the initial change and electronically, such as via email, sends the report to personnel responsible for managing IED 100. In one embodiment, the report also includes a serial number of the hardware to which the initial change is made. Upon determining that the continuous monitoring mode is not enabled, processor 128 determines 258 whether an instruction is received from the user to create the report. Processor 128 continues to check whether the instruction to create the report is received until the instruction is received from the user. Upon determining that the instruction is received from the user to create the report, processor 128 executes 242 and 256. In an alternative embodiment, 240, 242, 256, and 258 are executed by a processor within one of computing unit 12, view node computer 40, and view node computer 44 instead of processor 128.

Figure 8:
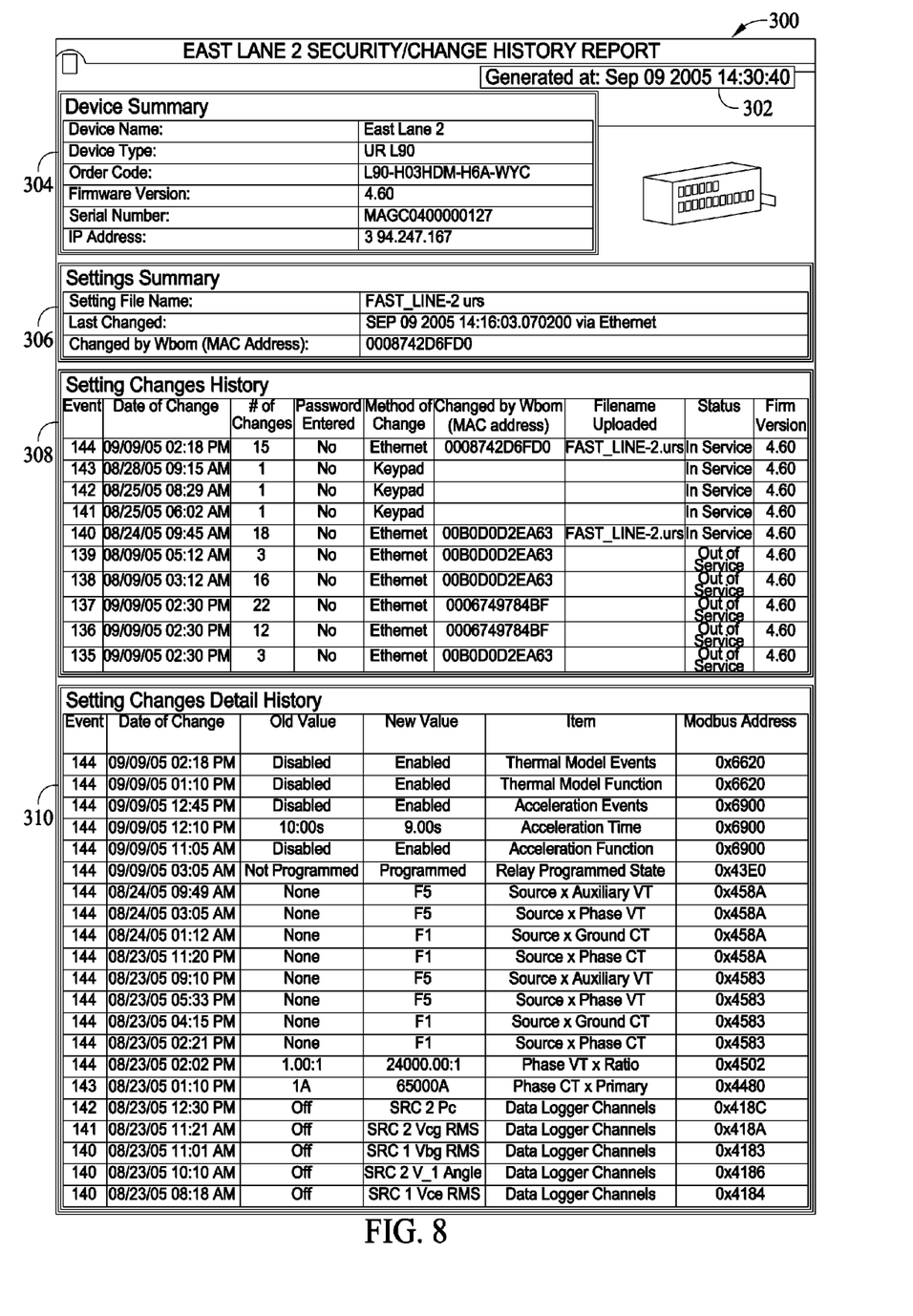
FIG. 8 is an embodiment of a report created by executing the method for capturing data.

FIG. 8 is an embodiment of a report 300 created by processor 128 at 256. Report 300 includes a date and time 302 of generation of report 300, a description 304 of a General Electric Multilin relay East Lane 2, which is an example of IED 100, a summary 306 of the additional change made to the configuration of East Lane 2, where the additional change is the last change made to the configuration of East Lane 2, a history 308 of a desired number, such as 10, of changes made to the configuration of East Lane 2, and a detailed description 310 of the initial change and the additional change made to the configuration of East Lane 2. In an alternative embodiment, report 300 is generated by a processor within one of computing unit 12, view node computer 40, and view node computer 44 upon receiving information within description 304, summary 306, history 308, and detailed description 310 from processor 128. Description 304 of East Lane 2 includes a name East Lane 2, a type of East Lane 2, an order code of East Lane 2, a version of the firmware within East Lane 2, and a serial number of East Lane 2. Summary 306 includes the name of the file uploaded into one of memories 118 and 120 within East Lane 2, a date and time of making the additional change within East Lane 2, the method of making the additional change within East Lane 2, and the MAC address that made the additional change within East Lane 2. History 308 includes the total number of sessions generated upon making changes within East Lane 2, a date and a time at which the initial change is made within East Lane 2, a date and a time at which the additional change is made within East Lane 2, the total number of changes made within East Lane 2, the status of entry of the password entered to make the initial and additional changes within East Lane 2. History 308 further includes the method of making the initial change within East Lane 2, the method of making the additional change within East Lane 2, the MAC address that made the initial change within East Lane 2, the MAC address that made the additional change within East Lane 2, the name of the file uploaded within East Lane 2 to make the initial change within East Lane 2, the name of the file uploaded within East Lane 2 to make the additional change within East Lane 2, the status of operation of processor 128 within East Lane 2 immediately before the start of the session, and a number of a version of the firmware, within East Lane 2, immediately before the start of the session.

Detailed description 310 includes the total number of sessions generated from the initial and additional changes within East Lane 2, a date and time of making the initial change within East Lane 2, a date and time of making the additional change within East Lane 2, values of the configuration, within East Lane 2, before and after the initial change, and values of the configuration, within East Lane 2, before and after the additional change. Detailed description 310 further includes a name of one of the firmware, hardware, and configuration, within East Lane 2, to which the initial change is made, a name of one of the firmware, hardware, and configuration, within East Lane 2, to which the additional change is made, a Modbus address of a register, within memory 116, of East Lane 2, in which the values of the configuration, within East Lane 2, before and after the initial change are stored, and a Modbus address of a register, within memory 116, of East Lane 2, in which the values of the configuration, within East Lane 2, before and after the additional change are stored.

It is noted that in an alternative embodiment, a plurality of sessions are executed simultaneously, where each session is associated within a different address, such as the MAC address and the IP address, and is associated with a separate timer within IED 100 to measure the pre-determined period of time. For example, if a request for making the initial change is received from view node 40, the session with the pre-determined period of time starts and if another request to make the initial change is received from computing unit 12, a separate session within the pre-determined period of time starts.

Technical effects of the herein describes systems and methods for capturing data include storing the cumulative information within at least one of volatile memory 120 and non-volatile memory 118 and the detailed information within non-volatile memory 118. The storage of the cumulative and the detailed information within memory 116 of IED 100 provides consistency in managing the cumulative and detailed information as compared to managing a first portion of the cumulative and detailed information stored within a first device outside IED 100 and a second portion of the cumulative and detailed information within a second device outside IED 100. The first portion may be different from the second portion. If the first portion is the same as the second portion, any updates to the first portion may be different than updates to the second portion. Moreover, the first device may be unaware of the updates to the second portion and the second device may be unaware of the updates to the first portion.

While the invention has been described in terms of various specific embodiments, those skilled in the art will recognize that the invention can be practiced with modification within the spirit and scope of the claims.

What is claimed is:

1. A method for capturing data comprises recording, within an intelligent electronic device (IED), information regarding changes to any of a firmware within the IED, a hardware within the IED, and a configuration within the IED, said method comprising:
   determining, by a processor within the IED, when an initial change in any of the firmware, the hardware and the configuration occurs;
   initiating in response to the determined initial change in any of the firmware, the hardware and the configuration, by the processor, a session of a predetermined period of time;
   generating and incrementing a number each time a change is made to any of the firmware, the hardware, and the configuration during said session to determine a total number of changes occurring during said session; and
   generating a text file including recording information, wherein said recording information comprises recording, by the processor, information occurring during the session.

2. A method in accordance with claim 1 further comprising:
   determining when an additional change is to be made to one of the firmware, the hardware, and the configuration; and
   extending the session for the pre-determined period of time when an additional change is determined to be made to one of the firmware, the hardware, and the configuration.

3. A method in accordance with claim 1 further comprising:
   ending, by the processor, the session when the pre-determined period of time has elapsed.

4. A method in accordance with claim 1 wherein said recording information comprises storing, during the session, in a memory within the IED, at least one of a date of start of the session, a time of start of the session, a number of a version of the firmware, and a status of operation of the processor.

5. A method in accordance with claim 1 wherein said recording information comprises storing, during the session, in a memory within the IED, at least one of an event type that is to be changed, wherein the event type includes one of the firmware, the hardware, and the configuration.

6. A method in accordance with claim 1 wherein said recording information comprises storing, during the session, in a memory within the IED, a method of making the initial change, wherein the method includes one of making the initial change via a keypad of the IED and making the initial change via a port of the IED.

7. A method in accordance with claim 1 wherein said recording information comprises storing, during the session, in a memory within the IED, at least one of an address of a device requesting the initial change and a status of entry of a password used to make the initial change, and a number of changes made during the session.

8. A method in accordance with claim 1 wherein said recording information comprises storing, during the session, in a memory within the IED, at least one of a name of a file uploaded to the processor and a username received from a computing unit that transmits the file that is uploaded.

9. A method in accordance with claim 1 wherein said recording information comprises storing, during the session, in a memory within the IED, at least one of a date of ending of the session and a time of ending of the session.

10. A method in accordance with claim 1 further comprising:
    receiving a passcode to access a memory within the IED; and
    providing, by the processor, an option to a user to erase the recorded information upon determining that the passcode is valid.

11. A method in accordance with claim 1 further comprising:
    generating a field on an interface to provide access to the incremented number.

12. A method in accordance with claim 1 further comprising:
    generating an event record by counting a plurality of sessions, wherein the plurality of sessions are generated from a plurality of changes made to one of the firmware, hardware, and configuration; and
    providing access to the event record to a user.

13. A method in accordance with claim 1 further comprising:

providing access to a status of the session to a user, wherein the status includes one of an active status when the session has begun and an inactive status when the the session has ended.

14. A method in accordance with claim 1 wherein said recording information comprises recording the information within a nonvolatile memory of the IED.

15. A method in accordance with claim 1 further comprising:
terminating, by the processor, a connection within a computing unit from which a portion of the information is obtained when the session has expired.

16. An intelligent end device (IED) comprising:
a memory; and
a processor programmed to:
record, within said IED, information regarding an initial change made to any of a firmware within the IED, a hardware within the IED, and a configuration within said IED;
determining an occurrence of said initial change in said any of the firmware, the hardware and the configuration;
initiate a pre-determined period of time, representing a session, after determination of said initial change;
generate and increment a number each time said initial change is made to the configuration during said session to determine a total number of changes occurring during said session; and
generate a text file including the recorded information, wherein said recorded information includes at least said total number of changes.

17. An IED in accordance with claim 16 wherein said processor is configured to determine if an additional change is to be made to one of the firmware, the hardware, and the configuration, and to extend the session for the pre-determined period of time.

18. An IED in accordance with claim 16 wherein said processor is configured to initiate a session of a pre-determined period of time and end the session when the predetermined period of time has elapsed.

19. An IED in accordance with claim 16 wherein said processor configured to store, during the session, in a memory within said IED, at least one of a date of start of the session, a time of start of the session, a number of a version of the firmware, and a status of operation of said processor.

20. An IED in accordance with claim 16 wherein said processor configured to store, during the session, in a memory within said IED, at least one of an event type that is to be changed, wherein the event type includes one of the firmware, the hardware, and the configuration.

21. A power management control system (PMCS) comprising:
a computing unit;
an interface coupled to said computing unit; and
an intelligent electronic device (IED) coupled to said computing unit via said interface, wherein said IED is separate from said computing unit, and said IED comprising a processor programmed to:
record, within said IED, information regarding an initial change made to any of a firmware within the IED, a hardware within the IED, and a configuration within said IED;
determine an occurrence of a change in any of the firmware, the hardware and the configuration;
initiate a pre-determined period of time, representing a session, after determination of said initial change;
generate and increment a number each time a change is made to any of the firmware, the hardware, and the configuration during said session to determine a total number of changes occurring during said session; and
generate a text file including the recorded information, wherein said recorded information includes at least the total number of changes.

22. A PMCS in accordance with claim 21 wherein said processor is configured to determine when an additional change is to be made to one of the firmware, the hardware, and the configuration is to be changed, and to extend the session for the pre-determined period of time.

23. A PMCS in accordance with claim 21 wherein said processor is configured to end the session when the pre-determined period of time has elapsed.

24. A PMCS in accordance with claim 21 wherein said processor is configured to store, during the session, in a memory within said IED, at least one of a date of start of the session, a time of start of the session, a number of a version of the firmware, and a status of operation of said processor.

25. A PMCS in accordance with claim 21 wherein said processor is configured to store, during the session, in a memory within said IED, at least one of an event type that is to be changed, wherein the event type includes one of the firmware, the hardware, and the configuration.

* * * * *